(12) United States Patent
Sumi et al.

(10) Patent No.: US 6,746,020 B2
(45) Date of Patent: Jun. 8, 2004

(54) METAL GASKET

(75) Inventors: Yuichi Sumi, Toyota (JP); Katsunori Ueda, Toyota (JP); Kazuyoshi Urata, Toyota (JP)

(73) Assignees: Toyota Jidosha Kabushiki Kaisha, Aichi-ken (JP); Nichias Corporation, Tokyo (JP)

( * ) Notice: Subject to any disclaimer, the term of this patent is extended or adjusted under 35 U.S.C. 154(b) by 0 days.

(21) Appl. No.: 10/145,570

(22) Filed: May 14, 2002

(65) Prior Publication Data

US 2002/0190479 A1 Dec. 19, 2002

(30) Foreign Application Priority Data

May 15, 2001 (JP) ........................................ 2001-145075

(51) Int. Cl.[7] ................................................ F16J 15/14
(52) U.S. Cl. ...................... 277/590; 277/598; 277/630; 411/999; 411/433
(58) Field of Search ................................. 277/592, 591, 277/598, 637, 640; 411/970, 999, 107, 523, 526, 527, 437, 433

(56) References Cited

U.S. PATENT DOCUMENTS

| | | | | |
|---|---|---|---|---|
| 551,702 | A | * 12/1895 | Wolfram | ...................... 293/25 |
| 5,513,855 | A | * 5/1996 | Yasui | ........................ 277/598 |
| 5,586,770 | A | * 12/1996 | Udagawa et al. | ........... 277/598 |
| 5,673,920 | A | * 10/1997 | Mockenhaupt | .............. 277/630 |
| 5,791,660 | A | * 8/1998 | Belter | ......................... 277/598 |
| 6,371,492 | B1 | * 4/2002 | Baron | ......................... 277/637 |
| 6,508,471 | B1 | * 1/2003 | Blau | ........................... 277/313 |

FOREIGN PATENT DOCUMENTS

JP          08-049597           2/1996

* cited by examiner

Primary Examiner—Robert J. Sandy
Assistant Examiner—Dinesh Melwani
(74) Attorney, Agent, or Firm—Flynn, Thiel, Boutell & Tanis, P.C.

(57) ABSTRACT

A metal gasket is designed so that mounting and removal from a cylinder block using a bolt is easy regardless of the direction of the attaching surface and there is no risk of moving or drop off. The gasket is made of two laminated metal base plates. At a base plate part near a bolt hole of one metal base plate, a bolt engaging piece projects so that the diameter of the bolt hole is smaller than the diameter of the bolt for fastening, and an assistant piece for handling is integrated thereto. At the base plate part of the other plate overlapping the assistant piece, a cut recess is formed. When inserting the bolt into the bolt hole of the metal gasket, the bolt engaging piece is struck against the bolt and is elastically bent, and allows the bolt to pass. The gasket mounted on the bolt is kept at the mounting position by the pressing action to the bolt from the impact resilience force of the bolt engaging piece. Furthermore, the metal gasket can easily be removed in such a way that the assistant piece is held with a fingertip or the like and the bolt engaging piece is separated from the screw part of the bolt. The recess of the metal base plate is useful for making the handling of the assistant piece easy.

5 Claims, 3 Drawing Sheets

METAL GASKET

BACKGROUND OF THE INVENTION

1. Field of the Invention

The present invention relates to a metal gasket, and more particularly, relates to an improvement of a metal gasket which is preferably used for a joining seal between a cylinder block and an exhaust manifold of an internal combustion engine.

2. Description of the Related Art

The gasket used in an internal combustion engine or the like has an opening for a cylinder which needs sealing and a bolt hole for fastening the gasket and the companion flange with a bolt for fastening.

Normally, the diameter of the bolt hole for attachment which is provided in the metal gasket is made larger than the diameter of the bolt to be used generally both for making the attachment of the gasket easy, and for absorbing the positional declination of the hole for attachment which is provided in the companion member.

In the case where the companion surface to which the metal gasket is attached is horizontal or has an angle larger than a right angle relative to the ground, it does not occur for the mounted metal gasket to move or to drop off because of vibration or the like, even if, for example, the mounting is performed by passing the bolt hole of the metal gasket onto the stud bolt on the attaching companion surface side in advance.

However, in the case where the attaching surface has an angle smaller than the verticality (is included to the ground surface side) or in the case where vibration is applied after the mounting, the metal gasket mounted on the bolt may move, or in some cases, drop off.

Especially, in the case of a gasket for the exhaust manifold of a V-type engine or the like, the attaching surface is inclined to the ground surface side, and therefore, it is necessary to incline the engine so that the attaching surface has an angle larger than at least the right angle or more for the mounting of the gasket.

Furthermore, in the case where the attaching surface is inclined to the ground surface side from the rectangular direction of the ground surface or in the case where the attaching surface cannot be inclined because of the peripheral equipment, the mounting of the metal gasket becomes very difficult.

As one for solving the problem, Japanese Patent Application Laid-Open No. 8-49597 proposes a metal gasket which is composed such that at the base plate part near the hole for attachment of the metal base plate, an engaging part projecting to the hole for attachment is provided by cutting work or the like.

According to the construction of this metal gasket, at the time of insertion of a shaft member into the hole for attachment provided in the metal gasket, the engaging part which has been struck against the shaft member is elastically bent and allows the insertion of the shaft member, and the metal gasket can firmly be held at the inserting position by the pressing action to the shaft member by the impact resilience force to be produced at that moment.

However, the gasket with the construction can easily be removed if the companion shaft member has a smooth peripheral surface like a pin, but in the case where the shaft member is a bolt for fastening, the bolt engaging part is caught by the screw part of the bolt and acts as a stopper, and therefore, it cannot easily be removed.

SUMMARY OF THE INVENTION

It is a main object of the present invention to provide a metal gasket wherein even if the shaft part is any one of a pin or a bolt, attaching and removing can easily be performed, and dropping off can be prevented.

In order to overcome the problems, the invention according to a first aspect is a metal gasket comprising one or a plurality of laminated metal base plates, wherein at the base plate part near the bolt hole for attachment which is provided in the metal base plate, a bolt engaging piece projects so that the diameter of the bolt hole is smaller than the diameter of the bolt for fastening, and an assistant piece used for the handling of separating the bolt engaging piece from the bolt is formed integrally with the bolt engaging piece.

Furthermore, the invention according to a second aspect is the metal gasket according to the first aspect, wherein the bolt engaging piece and the assistant piece for handling are formed by cutting work of the metal base plate.

DESCRIPTION OF THE PREFERRED EMBODIMENTS

Figure 1:
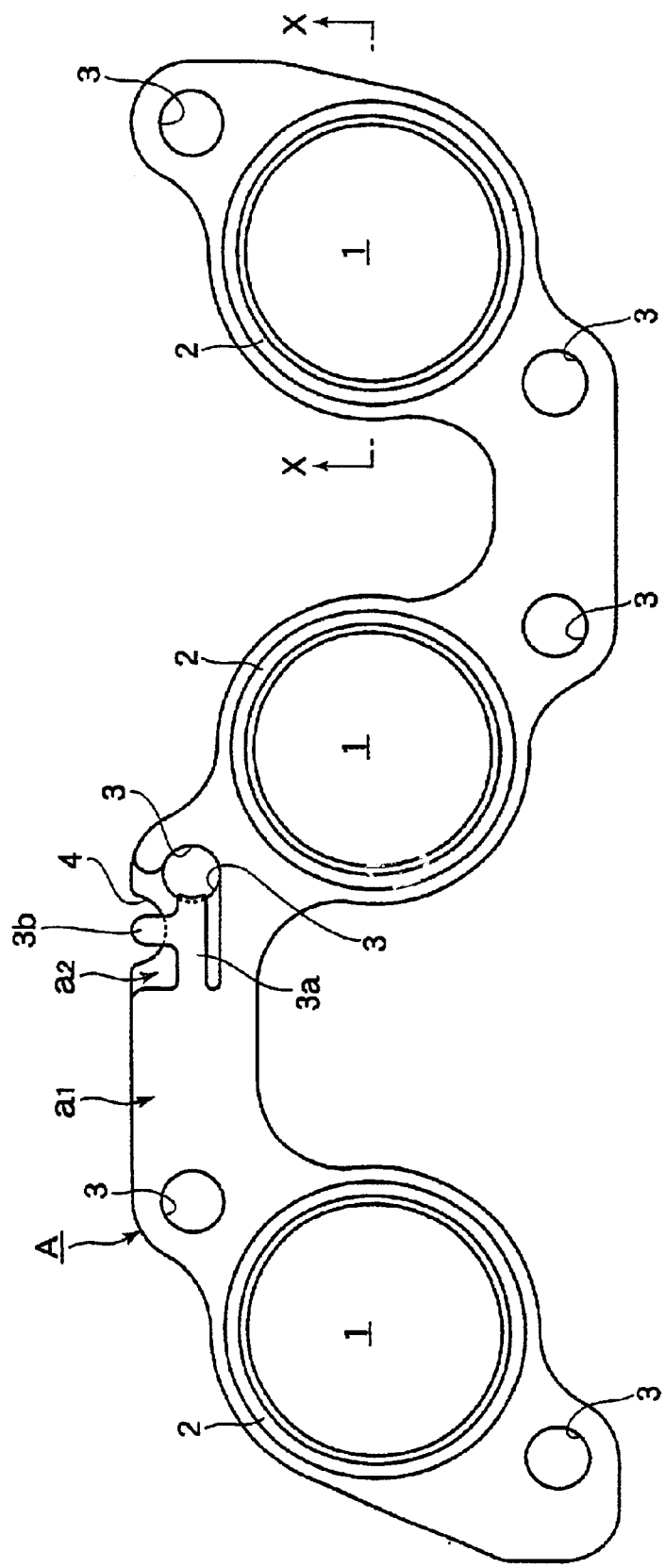
FIG. 1 is a plan view of a metal gasket showing one embodiment of the present invention.
Figure 2:
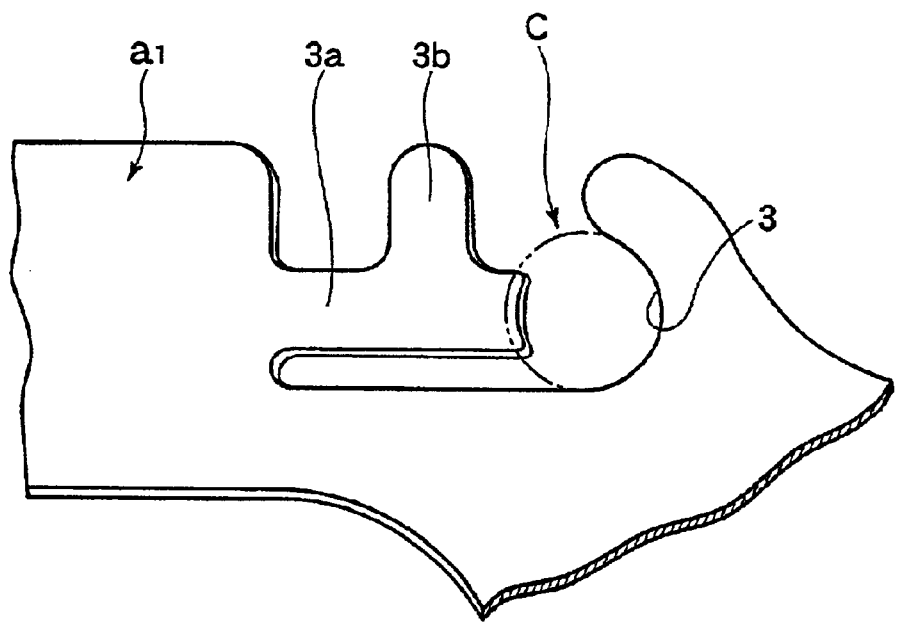
FIG. 2 is an enlarged illustration of the main part of one metal base plate to be laminated.
Figure 3:
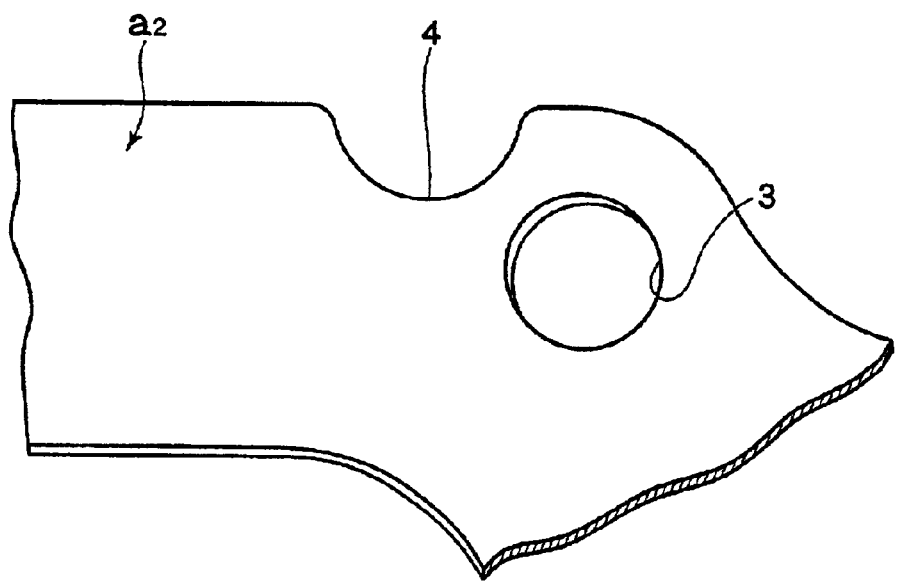
FIG. 3 is an enlarged illustration of the main part of the other metal base plate to be laminated.
Figure 4:
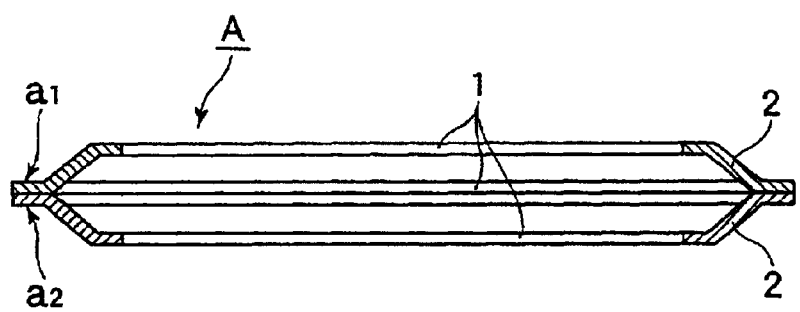
FIG. 4 is an enlarged cross sectional view of the line (X—X) in FIG. 1.

As shown in FIGS. 1 to 5, a preferred embodiment of the present invention is composed such that a metal gasket A comprises two laminated metal base plates $a_1$, $a_2$ which have a plurality of common aligned openings 1 for the cylinder, step type beads 2 provided at the peripheral parts surrounding the openings, and a plurality of bolt holes 3 for attachment. At a base plate part near the bolt hole 3 of one metal base plate $a_1$, a bolt engaging piece 3a projects so that the diameter of the bolt hole 3 is a little smaller than the diameter of the bolt C for fastening. An assistant piece 3b used for the handling of separating the bolt engaging piece from the bolt is integrally formed with the engaging piece 3a by cutting work, and at a base plate part overlapping the assistant piece 3b in the other metal base plate $a_2$, a recess 4 is provided.

According to the construction, when inserting the bolt C into the bolt hole 3, the bolt engaging piece 3a is struck against the bolt and is elastically bent, and allows the bolt to pass. The metal gasket A which has been mounted like this is kept at the mounting position by the pressing action to the bolt C by the impact resilience force of the bolt engaging piece 3a.

In the case of removing the mounted metal gasket, the assistant piece 3b is held up by a finger or using a tool or the like and the bolt engaging piece 3a is separated from the bolt, and consequently, removing can easily be performed.

In FIGS. 1 to 4, one example is shown, where the present invention is put into practice in a metal gasket to be mounted between the cylinder head and the exhaust manifold of an automotive internal combustion engine.

In FIG. 1, the metal gasket A is constructed such that two stainless steel elastic metal plates $a_1$, $a_2$ with a thickness of 0.25 mm are laminated and pivot welding is applied at a plurality of positions. Reference numeral 1 denotes an opening for the cylinder which is provided commonly to each base plate, and reference numeral 2 denotes a step type bead which is provided at the peripheral part surrounding the opening for the cylinder of each base plate, and reference numeral 3 denotes a bolt hole for attachment which is provided commonly to a plurality of positions of each base plate.

At the base plate part near one bolt hole 3 among the bolt holes for attachment of the base plate $a_1$, a bolt engaging piece 3a which projects so that the diameter of the bolt hole is made a little smaller than the diameter of the bolt to be used for fastening and has a necessary length and a width, and an assistant piece 3b for handling which is orthogonal thereto are integrally formed by cutting work.

In the other metal base plate $a_2$, a cut recess 4 is formed at the base plate part overlapped on the assistant piece 3b of the metal base plate $a_1$.

Figure 5:
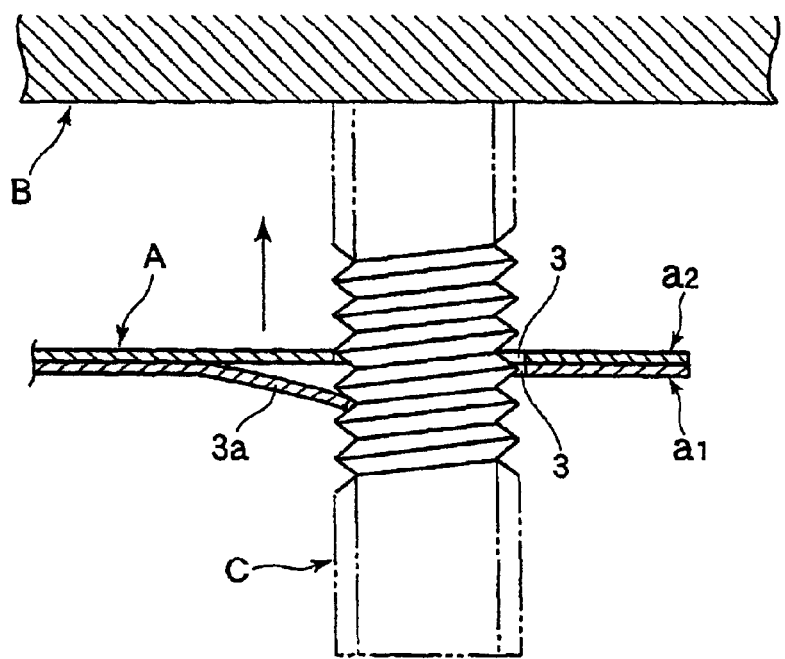
FIG. 5 is an explanatory drawing showing the state when the metal gasket is mounted.

FIG. 5 shows one example of use where the metal gasket A is mounted to the bolt C provided on the companion surface B.

The metal gasket A is mounted to the bolt C for fastening in the state where the base plate $a_2$ is facing to the companion surface side. In this case, the bolt hole 3 of the base plate $a_2$ can easily pass on the bolt C as it is. However, to the bolt hole 3 of the base plate $a_1$, the bolt engaging piece 3a is projecting so that the diameter of the hole becomes smaller than the diameter of the bolt C, but the bolt engaging piece 3a is struck against the bolt and is elastically bent, and allows the bolt C to pass. The metal gasket which has been mounted to the bolt like this is kept at the mounting position by the pressing action to the bolt by the impact resilience force of the bolt engaging piece 3a, and moving and dropping off of the gasket because of the inclination of the attaching surface or the vibration can be prevented.

Furthermore, when a need for removing the metal gasket is caused by any reason, it can easily be removed in such a way that the assistant piece 3b is held up by a fingertip or the like and the bolt engaging piece 3a is separated from the screw part of the bolt C. The cut recess 4 provided in the base plate $a_2$ is useful for making the handling of the assistant piece 3b easy.

It is preferable that the bolt engaging piece 3a has a narrow width relative to the bolt for attachment, both for making the mounting of the gasket easy and for making the handling of removing of the gasket easy. Furthermore, the handling of removing can be made easy by increasing the length of the bolt engaging piece. Moreover, the attachment can be made easy in such a way that the bolt engaging piece is provided to bolt holes at a plurality of positions of the base plate $a_1$, and the other bolt holes are made large.

In the case of the embodiment, the present invention is put into practice to a metal gasket comprising two laminated metal base plates, but an operational effect similar to that of the above description can also be obtained when the present invention is put into practice to one metal base plate.

As described above in detail, according to the present invention, a metal gasket can be obtained, wherein the mounting ability is enhanced at the part where the attachment is difficult or at the part where there is a risk such as the drop off because of the vibration caused by the movement or the like.

Furthermore, when a need for removing the metal gasket is caused by any reason, removing can easily be performed by separating the bolt engaging piece from the bolt.

Furthermore, according to the present invention, the diameter of the bolt hole to which the bolt engaging piece is provided is substantially decreased by the bolt engaging piece for fastening, and therefore, the declination between the bolt and the gasket can be decreased.

What is claimed is:

1. A metal gasket comprising at least one metal base plate, said metal base plate including an aperture for receiving a bolt and a bolt engaging piece having a projecting end projecting into the aperture to contact a bolt, the projecting end of the bolt engaging piece extending into the aperture so that the diameter of the aperture is smaller than the outer diameter of a bolt to be positioned therethrough and greater than the inner diameter of a bolt to be positioned therethrough, said metal base plate including an assistant piece which is monolithic with said bolt engaging piece for enabling removal of said metal gasket from between an exhaust manifold and a cylinder head of an internal combustion engine, said assistant piece having an assistant piece end projecting outwardly from said metal base plate, said assistant piece end defining a portion of an outer edge of said metal base plate.

2. The metal gasket according to claim 1, said metal base plate including a channel communicating with said aperture, said channel opening at an edge of said metal base plate along the entire thickness thereof so that said aperture does not surround the entire circumference of a bolt positioned through said aperture.

3. The metal gasket according to claim 1, wherein an edge of said assistant piece defines a first side of said bolt engaging piece, and wherein said metal base plate includes a slot defining a second side of said bolt engaging piece, said slot extending along the length of a side length of said bolt engaging piece to increase flexibility thereof.

4. The metal gasket according to claim 1, wherein said metal base plate comprises a first metal base plate and said aperture comprises a first aperture, said metal gasket including a second metal base plate secured in surface-to-surface contact with said first metal base plate, said second metal base plate including a second aperture for surrounding the entire circumference of a bolt inserted through said second aperture.

5. The metal gasket according to claim 4, including a cut recess formed at an edge of said second metal base plate, said cut recess being aligned adjacent said assistant piece to provide access thereto for removal of said gasket from between an exhaust manifold and a cylinder head of an internal combustion engine.

\* \* \* \* \*